Feb. 20, 1951  F. A. J. ROJAS ET AL  2,542,945
SAFETY ELECTROMAGNETIC CIRCUIT BREAKER
Filed March 24, 1948  2 Sheets-Sheet 1
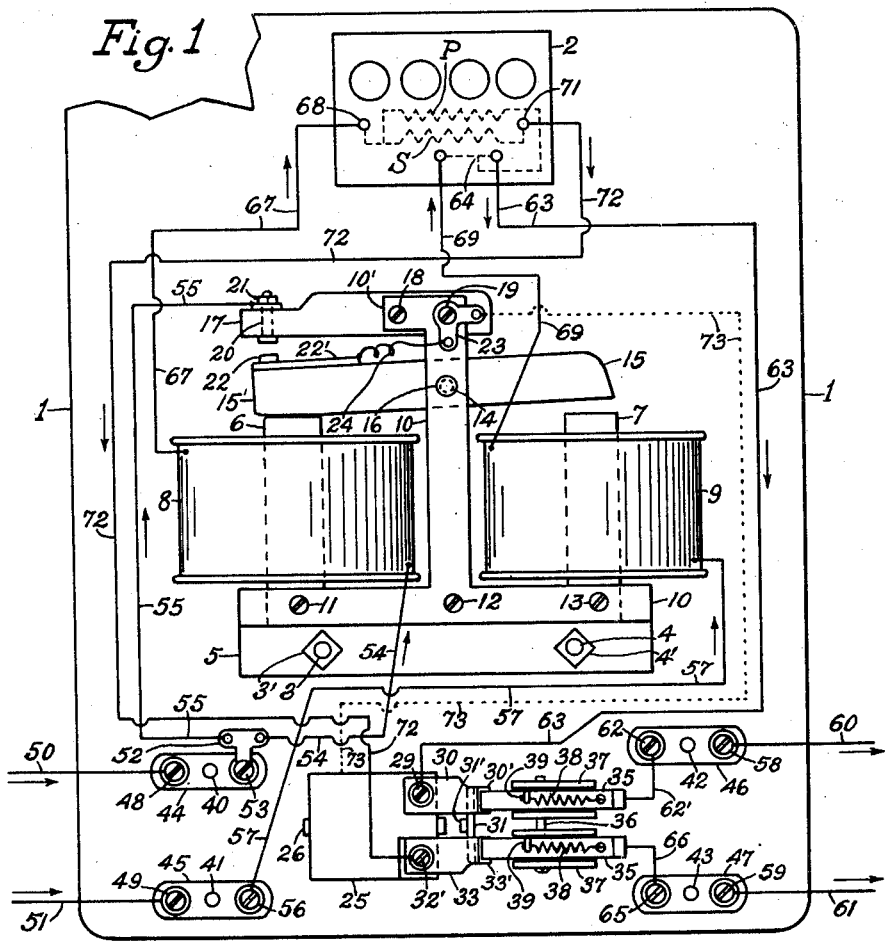
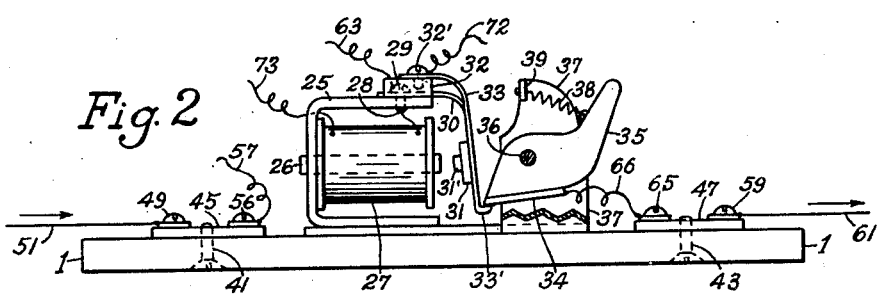
INVENTORS:
Francisco Antonio Jaimes Rojas
Manuel Antonio Martinez Rivas
BY Singer, Ehlert, Stern & Carlberg
ATTORNEYS.

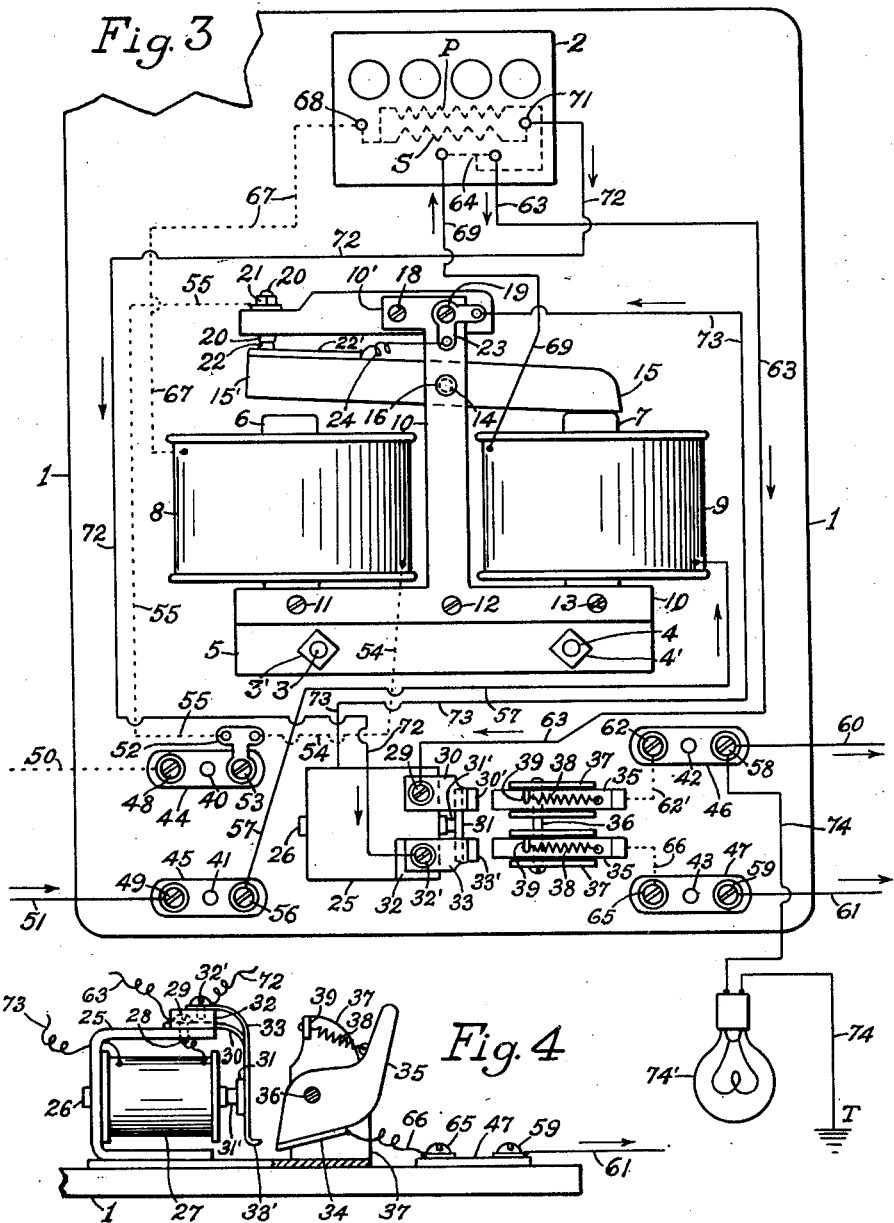

Patented Feb. 20, 1951

2,542,945

UNITED STATES PATENT OFFICE 2,542,945

SAFETY ELECTROMAGNETIC CIRCUIT BREAKER

Francisco Antonio Jaimes Rojas and Manuel Antonio Martinez Rivas, Guantanamo, Cuba Application March 24, 1948, Serial No. 16,854

4 Claims. (Cl. 171—95)

This invention relates to electro-magnetic circuit breakers for the protection of electrical meters and supply lines in electric current distribution systems for public, domestic and industrial services, and it has for its object to provide an apparatus of that kind which is composed of a pair of electro-magnets having a common iron core, the coil of one of the electro-magnets having a number of wire windings and winding layers greater than the number of wire windings and winding layers of the coil of the other electro-magnet, the input terminals of both coils being connected with the poles of the electric supply circuit and the output terminals of both coils being respectively connected with the input terminals of the series coil and the potential coil of the meter, the output terminals of both coils of the meter being connected respectively with an insulated member and a non-insulated member of the armature of a third electro-magnet, each of said members carrying a movable contact that is normally connected with a fixed contact respectively secured to one of the two poles of the electric output circuit, but in such a way that the movable contacts may incidentally be withdrawn from the fixed contacts, and on the common core to the two firstly mentioned electro-magnets there is pivotally mounted a lever of unequal arms of which the longer arm normally rests by gravity on the core of the electro-magnet the coil of which comprises a greater number of wire windings and winding layers. Said lever carries an insulated contact connected with one of the terminals of the latter coil and is secured to the non-insulated member of the armature of said third electro-magnet, the insulated contact carried by said lever being adapted to contact in one of the two positions of the lever, as it is attracted by the core of the second coil of shorter winding length of the two firstly mentioned electro-magnets, with a fixed contact adjustably supported on an electricity insulating block and which is connected with one of the poles of the electric supply circuit, so that normally, as electric current flows through both supply and output lines at an equal amperage, the lever will remain unalterably detached from the adjustable fixed contact, but, should the lines of the electric supply circuit be accidentally reversed and one of the output lines connected to ground through an appliance, the other end of the lever will become attracted by the core of the coil of shorter winding and the coil of the third electro-magnet will be inserted in the electric circuit, with the result that the two movable contacts of the armature thereof will be operated at the same time and caused to disengage from the fixed contacts secured directly to the two terminals of the output line, thereby interrupting the flow of electric current through the output line and preventing every possible connection between both input and output lines.

Another object of the invention is to provide a novel structure of safety electro-magnetic circuit breaker for the protection of meters and electric energy supply lines, which can be easily assembled and disassembled, it being at the present time the only device of that kind manufactured for said purpose.

The invention is described with reference to the figures of the accompanying drawing, of which:

Fig. 1 is a plan view of the supporting base for the device of this invention, and the electrical meter to which it is connected, in the normal position of the device.

Fig. 2 is an outer elevational view of the same base showing the electro-magnetic circuit breaker in side elevation, also in its normal position.

Fig. 3 is a similar view to that of Fig. 1, showing in an alternative position the lever rotatably mounted on the common core of the first and second electro-magnets to cause the operation of the electro-magnetic circuit breaker.

Fig. 4 is a similar view to that of Fig. 2, showing the electro-magnetic circuit breaker in the position in which the two movable contacts are disengaged from the fixed contacts secured to the terminals of the output line.

In the drawings, the numeral 1 indicates a supporting base molded of Bakelite or other electricity insulating material, on the top portion of which there is mounted the usual electrical meter 2. On the central portion of said insulating base 1 there is secured as by screws 3 and 4 and nuts 3' and 4' the lower flange of a double-angle metal plate 5 supporting the cores 6 and 7 of two electro-magnets whose coils 8 and 9 comprise a dissimilar number of wire windings and winding layers, the coil 8 having a greater number of wire windings than the coil 9. The cores 6 and 7 are preferably formed of a plurality of iron strips of double U-shape vertically juxtaposed one next to the other to form a common core for both electro-magnets by means of two opposed metal plates 10 of inverted T-shape, which are arranged vertically at the opposed sides of the double U-shaped iron strips forming the cores 6 and 7 and all are secured to the upper flange of the double angle metal plate 5 by means of transverse bolts 11, 12 and 13 passing across holes formed in said upper flange, across holes in the iron strips forming the common core and across holes formed in the plates 10, said bolts being secured in position by nuts screwed on a threaded end of said bolts.

The cores 6 and 7 of both coils 8 and 9 project upward from the respective coils and between the central legs of the two metal plates 10 there is pivotally mounted through a threaded horizontal pivot pin 14 a metal lever 15 of unequal arms, through a thread hole of which passes and is secured the thread of pin 14 whose ends are rotatably mounted in holes 16 of said plates 10, so that the longest arm of said lever 15 normally rests by gravity on the core 6 of the coil 8. The metal plates 10 also support on a right-angle extension 10' formed at its top end an electricity insulating block 17 which is fixed by screws 18 and 19 to the extensions 10' and which carries at its end opposite the coil 8 an adjustable contact formed by a screw 20 passing across a threaded hole in the block 17 and being secured in position by a nut 21. Said fixed contact 20 remains situated opposite a movable contact 22 carried on the end of the longer arm of the lever 15 that is opposite the coil 8. On the screw 19 there is insulatedly mounted a metal angular plate 23 one of whose ends is connected through a lead 24 with a plate 22' carrying the metal contact 22.

On the lower portion of the supporting base 1 there is mounted a third electro-magnet whose armature 25 is in the shape of a laid down U and is provided with a central horizontal core 26 on which is supported a coil 27 a terminal 28 of which is connected to the armature 25. The latter has secured at a side of its top portion through a screw 29 the top horizontal portion of a downwardly angularly bent spring sheet 30 having its lower end in the shape of a hook 30'. At the other side of the top portion of armature 25 and through an intermediate electricity insulating plate 32 there is secured by a screw 32' a spring sheet 33 whose shape and construction is equal to that of sheet 30, the same ending at its bottom portion in the shape of a hook 33'. Both flexible sheets 30 and 33 are joined together by means of an electricity insulating plate 31 carrying a metal core 31' oppositely the core 26. The hooks 30' and 33' thus form two movable contacts adapted respectively to be normally engaged by the edges of two metal plates 34 secured to the lower faces of two spaced apart pivot levers 35 which are formed by electricity insulating blocks and are pivotally mounted through a common horizontal pivot pin 36 on the raised side portions of two metal supporting sockets 37 parallelly and spacedly apart fixed to the base 1 opposite the flexible sheets 30 and 33 depending from the armature 25 of the third electro-magnet. The levers 35 carry a raised arm which is connected through a coil spring 38 with an arm 39 projecting from one of the side portions of each of the supporting sockets 37.

The electrical connections between the various parts of the device are as follows: on the base 1 there are secured respectively by means of screws 40, 41, 42 and 43 four metal plates 44, 45, 46 and 47, two at the left side and two at the right side. The plates 44 and 45 at the left side have binding posts 48 and 49 forming the input poles of the leads 50 and 51 that form the electric energy supply line, which is of the alternating current type. As usual, one line 50 is grounded (not shown). The plate 44 carries another binding post formed by a T-shaped plate 52 secured by a screw 53 to the plate 44 and which includes two connections, one through conductor 54 to one terminal of the coil 8 and another through conductor 55 to the screw 20 forming a fixed contact. The plate 45 carries another binding post 56 connected through conductor 57 to one terminal of coil 9. The plates 46 and 47 carry respectively binding posts 58 and 59 forming the input poles of conductors 60 and 61 that form the electric current output line. The plate 46 carries another binding post 62 which is connected through a lengthening conductor 62' with the metal plate 34 situated beneath the lever 35 that remains opposite the movable sheet 30 connected directly to the armature 25 of the third electro-magnet. And plate 47 carries another binding post 65 which is connected through a lengthening conductor 66 with the contact plate 34 secured to the lever 35 situated opposite the movable sheet 33 secured through insulating plate 32 to the armature 25 of the third electro-magnet.

The coil 8 has its other terminal connected through conductor 67 with the input terminal 68 of the series coil S of electrical meter 2. The coil 9 has its other terminal connected through conductor 69 with the terminal 64 of the potential coil P of the electrical meter 2 whose other terminal is shunted on the series coil of the electrical meter 2. The potential coil of the electrical meter 2 is connected through conductor 63 with the screw 29 mounted directly on the armature 25 of the third electro-magnet and connected to the movable sheet 30. The output terminal 71 of the series coil of electrical meter 2 is connected through conductor 72 with the screw 32' isolately mounted on the armature 25 and connected to the movable sheet 33 of the third electro-magnet. And the connection plate 23 is connected at its horizontal arm through conductor 73 with the free terminal of coil 27 of the third electro-magnet.

The operation of this device is as follows: normally, while electric current supplied to the electric output circuit is taken at the respective output terminals of the meter 2, the device will remain substantially unaltered, electric current passing through coil 8 and series coil of the meter 2 to the screw 32' and through movable sheet 33 now connected with the plate 34 and through conductor 66 to the plate 47, the current will flow directly to the output line 61. However, if the lines of the electric supply circuit are accidentally reversed and the conductor 60 of electric output line is grounded by a shunt formed by a conductor 74 which leads to ground T through an incandescent lamp 74', coil 8 will not be energized, while the amount of electric current taken from the electric supply line will only pass through coil 9 but not through the series coil of the meter 2, thereby creating a powerful magnetization in the core 7 of coil 9, which will overcome the weight of the longer arm of lever 15 and attract the shorter arm of said lever 15, causing the movable contact 22 to contact the adjustable fixed contact 20, the electric circuit being thus closed through coil 27 of the electro-magnetic circuit breaker following the course 51—49—45—56—57—9—69— 64—63—29—28—27—73—23—22'—22—20—55— 52—53—44—48—50 to ground, whereupon the core 26 will attract the movable plates 30 and 33 and cause the hooks 30' and 33' to disengage from the edges of the contact plates 34. As the latter are released, the levers 35 will oscillate outward by reason of the elastic tension of the springs 38 and the flow of electric current through output line 60—61 will be thus automatically interrupted.

The relay is reset, after correcting the inversion of the electric supply to lines 50 and 51, by pulling the levers 35 downwardly causing them to reengage the hooks 30' and 33' which have returned to their normal positions on deenergization of the coil 27.

It is obvious tthat changes may be made in the shape of the parts as well as in the construction details of the device, without thereby altering the essential character of the invention, which is such as claimed hereinafter.

What we claim is:

1. A safety electro-magnetic circuit breaker for the protection of electric meters and electric supply lines comprising, in combination, two supply lines, two output lines, two electro-magnets of dissimilar winding length, each of said electro-magnets being connected respectively to one supply line and one output line, an electric meter being connected between said electro-magnets and said output lines, a stationary contact connected to one of said supply lines, a contact carrying lever oscillatably mounted adjacent said electro-magnets for movement by magnetic attraction from a normal gravitational position out of engagement with said stationary contact to a contact engaging position, a third electro-magnet, a pair of movable contacts arranged to be actuated by said third electro-magnet, said third electro-magnet being connected between one of said two electro-magnets and said contact carrying lever, each of said pair of movable contacts being connected to said electric meter, and contact means oscillatably mounted under elastic tension between said pair of movable contacts and said output lines, said contact means being held against movement under elastic tension by said pair of movable contacts, so that in the event of the poles of the supply line being inverted, the position of said lever will be magnetically changed and will contact said stationary contact to allow energization of said third electro-magnet to thus cause attraction of said pair of movable contacts resulting in the release of said oscillatable contact means and interruption of the flow of current through said output lines.

2. A safety electro-magnetic circuit breaker for the protection of electric meters and electric current supply lines, comprising two supply lines, two output lines, two electro-magnets having a dissimilar winding length and a common core, each of said electro-magnets being connected respectively to one supply line and one output line, an electric meter being connected between said electro-magnets and said output lines, an adjustable fixed contact connected to one of said supply lines, a contact carrying lever oscillatably mounted on said common core of said two electro-magnets and arranged to rest alternately under gravitational action or magnetic attraction against one or the other of said two electro-magnets and against said adjustable fixed contact, a third electro-magnet having an armature connected with one of the terminals of its coil and with the potential coil of said electric meter and having its other coil terminal connected with a contact insulatedly carried by said oscillatably mounted lever, two movable contact members, one of said movable contact members being mounted directly and the other being mounted insulatedly on the top portion of said armature of said third electro-magnet and both members being connected with the coils of said electric meter, and contact means mounted oscillatably under elastic tension between said movable contact members of said armature of said third electro-magnet and said output lines, so that in the event of the supply lines being inverted accidentally, the position of the oscillatory lever will be automatically changed and the same will engage the adjustable fixed contact and upon the third electro-magnet being energized the flow of current through said output lines will be interrupted by the attraction of said movable contact members and the disengagement of said contact means under elastic tension from said movable contact members.

3. A safety electro-magnetic circuit breaker for the protection of electric meters and electric current supply lines, comprising an electricity insulating supporting base, two supply lines, two output lines, two electro-magnets having a dissimilar winding length at their coils and a common core, supporting means for said common core of both said electro-magnets on said supporting base, each of said two electro-magnets being connected respectively to one supply line and one output line, an electric meter, said electro-magnet having a longer winding length being connected with one terminal of the series coil of said electric meter and said electro-magnet having a shorter winding length being connected with one terminal of the potential coil of said electric meter, an adjustable fixed contact connected to one of said supply lines, a contact carrying lever oscillatably mounted on said common core of said two electro-magnets, a third electro-magnet having an armature supported on said supporting base and secured to one terminal of its coil and connected with said potential coil of said electric meter, the other terminal of said coil of said third electro-magnet being connected with a contact insulatedly carried on said oscillatably mounted lever, a movable-contact flexible member directly secured at one end of said armature of said third electro-magnet, a second movable-contact flexible member insulatedly secured at one end of said armature of said third electro-magnet, and electricity insulating members oscillatably mounted under the elastic tension of a spring oppositely to said movable-contact members and carrying contacts respectively connected with said output lines and normally in engagement with said movable-contact members, so that in the event of said supply lines being inverted accidentally, the coil of shorter winding length of said two electro-magnets will be energized and the position of said oscillatably mounted lever will be automatically changed to engage said adjustable fixed contact and upon said third electro-magnet being energized, the flow of electric current through said output lines will be interrupted by attraction of said movable-contact members by the core of said armature of said third electro-magnet and by disengagement of said contacts carried by said electricity-insulating oscillatable member under elastic tension from said movable contact members.

4. A safety electro-magnetic circuit breaker for the protection of electric meters and electric current supply lines, comprising, an electricity insulating supporting base, two supply lines, two output lines, two electro-magnets having a dissimilar winding length and a common core, means on said supporting base for supporting said common core of said electro-magnets, each of said electro-magnets being connected respectively to one supply line and one output line, an electric meter having coils inserted between said electro-magnets and said output lines, an adjustable fixed contact connected to the same supply line to which the electro-magnet having the longest winding of said two electro-magnets is connected, a contact carrying lever having dissimilar arms oscillatably mounted on the core of said two electro-magnets and between same and said adjustable fixed contact so that the lever will normally rest by gravity effect of its longer arm on said longer winding magnet of said two electro-magnets, a third electro-magnet supported on said supporting base and having an armature secured to one terminal of its own coil and connected with the potential coil of said electrical meter, the other terminal of said coil of said third electro-magnet being connected with a contact insulatedly carried by said oscillatably mounted lever, a movable-contact flexible member secured directly at one end on said armature of said third electro-magnet, a second movable-contact flexible member insulatedly fixed at its top end on said armature of said third electro-magnet, electricity insulating members oscillatably mounted under the elastic tension of a spring oppositely said movable-contact members respectively and carrying contacts connected respectively with said output lines and normally engaged by said movable-contact flexible members, so that in the event of said supply lines being inverted accidentally, the magnetic attraction of the shorter winding magnet of said two electro-magnets will prevail upon the oscillatably mounted lever and the position of the latter will be automatically changed to a position of engagement with said adjustable fixed contact whereby the third electro-magnet will be energized to cause the core of its armature to attract said movable-contact flexible members whereupon the contact between said flexible members and said contacts secured to said oscillatably mounted electricity-insulating members will be automatically interrupted and the flow of electric current through said output lines will cease upon disengagement of said oscillatable insulating members under the elastic tension from said said movable-contact flexible members.

FRANCISCO ANTONIO JAIMES ROJAS.
MANUEL ANTONIO MARTINEZ RIVAS.

REFERENCES CITED

The following references are of record in the file of this patent:

UNITED STATES PATENTS

| Number | Name | Date |
|---|---|---|
| 2,063,349 | Sharp | Dec. 8, 1936 |

FOREIGN PATENTS

| Number | Country | Date |
|---|---|---|
| 491,420 | Germany | Feb. 10, 1930 |